(12) United States Patent
Dondaine et al.

(10) Patent No.: US 8,794,847 B2
(45) Date of Patent: Aug. 5, 2014

(54) BEARING ASSEMBLY WITH AXIAL RETAINER

(75) Inventors: Herve Dondaine, Avallon Cedex (FR); David Sabatier, Avallon Cedex (FR); Anastazi Sarigiannis, Livonia, MI (US); Gabriel Michel, Canton, MI (US)

(73) Assignee: Aktiebolaget SKF, Gothenburg (SE)

( * ) Notice: Subject to any disclaimer, the term of this patent is extended or adjusted under 35 U.S.C. 154(b) by 120 days.

(21) Appl. No.: 13/469,833

(22) Filed: May 11, 2012

(65) Prior Publication Data

US 2014/0029880 A1  Jan. 30, 2014

Related U.S. Application Data

(60) Provisional application No. 61/534,603, filed on Sep. 14, 2011.

(51) Int. Cl.
*F16C 21/00* (2006.01)
*F16C 19/52* (2006.01)
*F41A 27/16* (2006.01)

(52) U.S. Cl.
CPC ....................................... *F41A 27/16* (2013.01)
USPC ............................ 384/624; 384/126; 384/609

(58) Field of Classification Search
CPC ...... F16C 19/52; F16C 29/041; F16C 19/362; F16C 21/00
USPC ......... 384/624, 590, 609, 615, 608, 622, 447, 384/126, 127
See application file for complete search history.

(56) References Cited

U.S. PATENT DOCUMENTS

| | | | | |
|---|---|---|---|---|
| 2,352,911 | A | * | 7/1944 | Osplack ........................ 384/126 |
| 2,643,920 | A | * | 6/1953 | Olszewski .................... 384/619 |
| 3,361,500 | A | * | 1/1968 | Pohler .......................... 384/569 |
| 3,445,146 | A | * | 5/1969 | Merritt et al. ................. 384/126 |
| 3,517,975 | A | * | 6/1970 | Davidson et al. ............. 384/619 |
| 4,463,995 | A | * | 8/1984 | Andree ......................... 384/620 |
| 4,938,610 | A | * | 7/1990 | Kato ............................. 384/126 |
| 5,441,350 | A | * | 8/1995 | Fujita ........................... 384/447 |
| 6,113,276 | A | * | 9/2000 | Bourgeois-Jacquet ....... 384/448 |
| 6,176,620 | B1 | * | 1/2001 | Obara ........................... 384/127 |
| 8,459,872 | B2 | * | 6/2013 | Nies et al. .................... 384/126 |
| 2009/0028731 | A1 | * | 1/2009 | Englander et al. ........... 384/126 |

* cited by examiner

*Primary Examiner* — Thomas R Hannon
(74) *Attorney, Agent, or Firm* — Mark A. Ussai; SKF USA Inc. Patent Department

(57) ABSTRACT

A bearing assembly includes an outer ring having an inner circumferential surface and a generally annular recess extending radially outwardly from the inner surface. An inner ring is disposed at least partially within the outer ring so as to be rotatable about a central axis, the inner ring having an outer circumferential surface spaced radially inwardly from the outer ring inner surface and at least one integral shoulder extending radially outwardly from the outer surface so as to be disposed at least partially within the outer ring recess. The shoulder is engageable with the outer ring when the inner ring is subjected to an axial force so as to substantially prevent axial displacement of the inner ring relative to the outer ring. Preferably, a plurality of rolling elements are disposed between and rotatably couple the inner and outer rings.

14 Claims, 5 Drawing Sheets

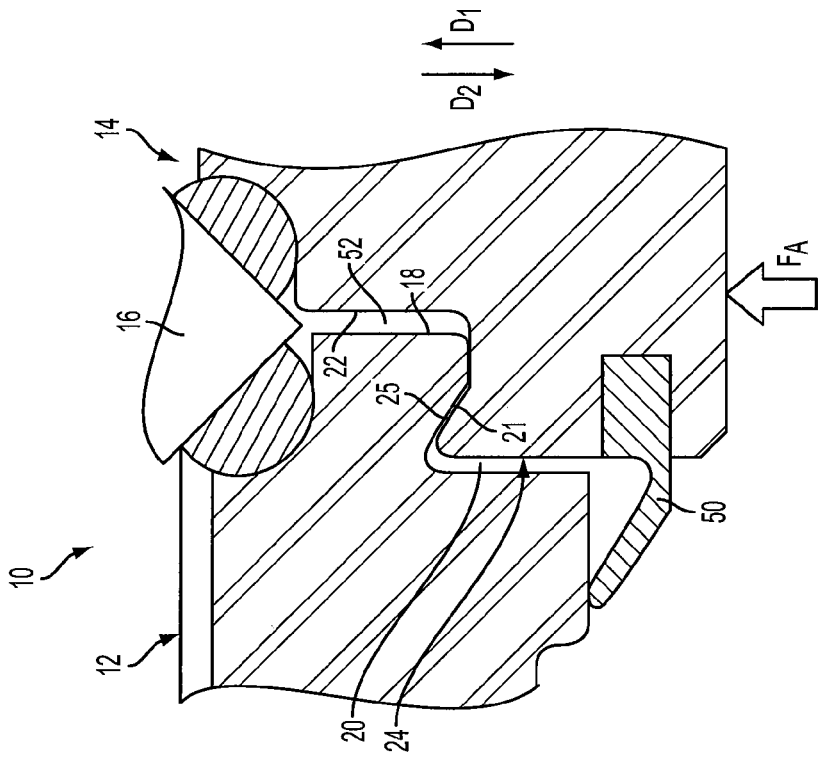
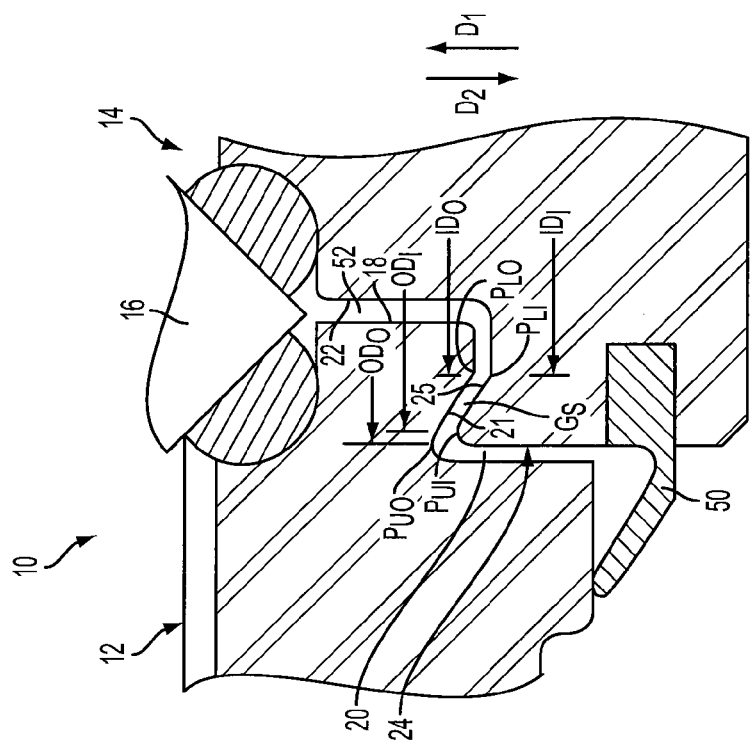

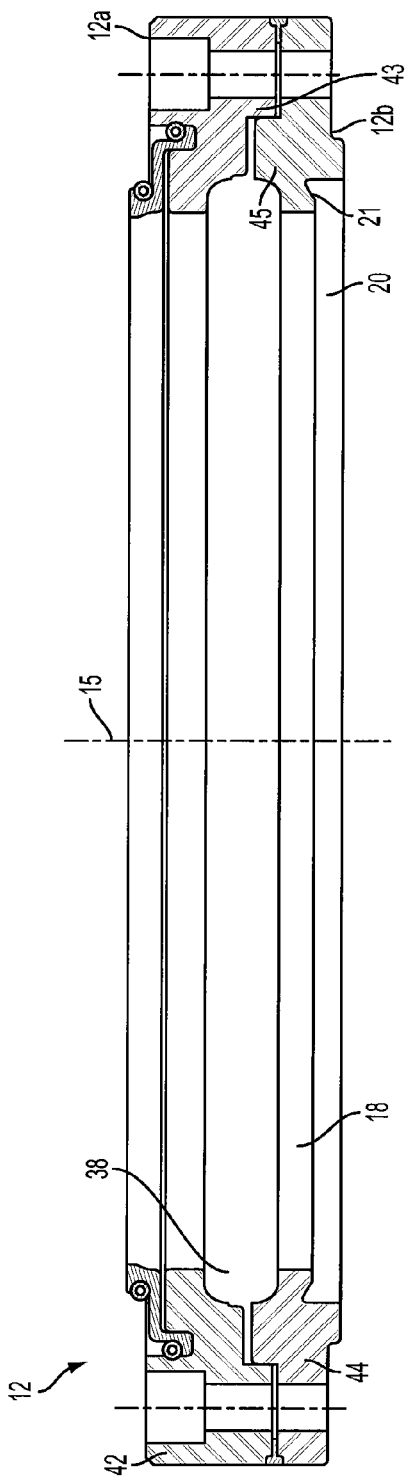
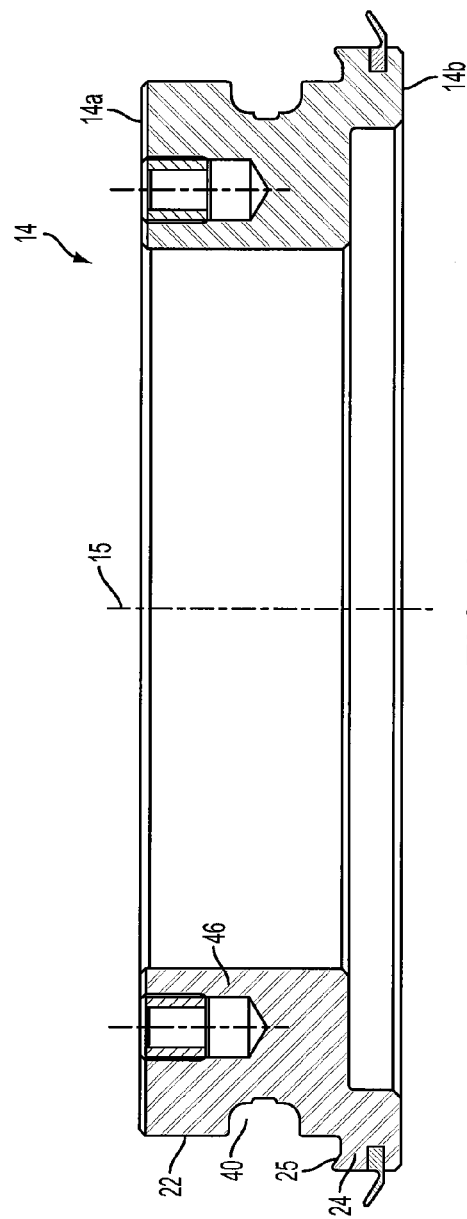
FIG. 5
FIG. 6

BEARING ASSEMBLY WITH AXIAL RETAINER

CROSS-REFERENCE TO RELATED APPLICATIONS

This application claims the benefit of U.S. Provisional Application No. 61/534,603, filed Sep. 14, 2011, the contents of which are incorporated fully herein by reference.

BACKGROUND OF THE INVENTION

The present invention relates to bearing assemblies, and more particularly to bearing assemblies for turrets on military vehicles.

Bearing assemblies for applications such as turrets on military vehicles are known and typically include inner and outer rings and a number of rolling elements between the rings. The outer ring is mounted to the vehicle roof, the inner ring is connected with a weapons turret and the rolling elements rotatably support the inner ring within the outer ring. Such an assembly facilitates rotation of the turret during the use of weapons mounted in the turret (e.g., machine guns, mortars, etc.).

One problem with known turret bearing assemblies has resulted from catastrophic events such as the detonation of a mine, improvised explosive device ("IED"), bomb or other explosive weapon beneath the vehicle. The resulting explosion generates a substantial force directed vertically upward against the turret bearing assembly, which often causes a vertical displacement of the inner ring relative to the outer ring. Such relative displacement can damage and/or jam the rolling elements of the bearing, particularly when the bearing assembly is a wire race bearing, thereby inhibiting rotation of the turret and potentially preventing defensive usage of the turret mounted weapons. In extreme circumstances, the magnitude of the energy transmitted to the vehicle may be such as to cause a complete separation of the inner and outer rings, which may result in the ejection of, and injury or death to, an operator within the turret.

SUMMARY OF THE INVENTION

In a first aspect, the present invention is a bearing assembly comprising an outer ring having an inner circumferential surface and a generally annular recess extending radially outwardly from the inner surface and an inner ring disposed at least partially within the outer ring so as to be rotatable about a central axis. The inner ring has an outer circumferential surface spaced radially inwardly from the outer ring inner surface and at least one integral shoulder extending radially outwardly from the outer surface so as to be disposed at least partially within the outer ring recess. The shoulder is engageable with the outer ring when the inner ring is subjected to an axial force so as to substantially prevent axial displacement of the inner ring relative to the outer ring. Preferably, the bearing assembly further comprises a plurality of rolling elements disposed between and rotatably coupling the inner and outer rings.

In another aspect, the present invention is again a bearing assembly, which comprises an outer ring and an inner ring, and preferably also a plurality of rolling elements disposed between and rotatably coupling the outer and inner rings. The outer ring has an inner circumferential surface, a generally annular recess extending radially outwardly from the inner surface, and a generally radial catch surface partially defining the annular recess. The inner ring is disposed at least partially within the outer ring so as to be rotatable about a central axis, the inner ring having an outer circumferential surface spaced radially inwardly from the outer ring inner surface and at least one shoulder extending radially outwardly from the outer surface so as to be disposed at least partially within the outer ring recess. The shoulder has a generally radial retention surface facing the outer ring catch surface, the catch and retention surfaces being engageable when the inner ring is subjected to at least an amount of axial force sufficient to bias the inner ring against the outer ring so as to substantially prevent axial displacement of the inner ring relative to the outer ring.

In yet another aspect, the present invention is a bearing assembly for rotatably coupling a weapons turret to a vehicle, the vehicle having a roof. The bearing assembly comprises an outer ring fixedly connected with the roof and having an inner circumferential surface and a generally annular recess extending radially outwardly from the inner surface. An inner ring is connectable with the turret and disposed at least partially within the outer ring so as to be rotatable about a central axis, the inner ring having an outer circumferential surface spaced radially inwardly from the outer ring inner surface and at least one integral shoulder extending radially outwardly from the outer surface so as to be disposed at least partially within the outer ring recess. The shoulder is engageable with the outer ring when the inner ring is subjected to an axial force so as to substantially prevent axial displacement of the inner ring relative to the outer ring. Further, a plurality of rolling elements is disposed between the inner and outer rings.

BRIEF DESCRIPTION OF THE SEVERAL VIEWS OF THE DRAWINGS

The foregoing summary, as well as the detailed description of the preferred embodiments of the present invention, will be better understood when read in conjunction with the appended drawings. For the purpose of illustrating the invention, there is shown in the drawings, which are diagrammatic, embodiments that are presently preferred. It should be understood, however, that the present invention is not limited to the precise arrangements and instrumentalities shown. In the drawings:

FIGS. 3A and 3B, collectively FIG. 3, are each an enlarged view of a lower portion of the bearing assembly of FIG. 2, FIG. 3A showing the assembly in a normal operating state and FIG. 3B showing the bearing assembly during an explosion;

FIG. 5 is an axial cross-sectional view of an outer ring of the bearing assembly of the present invention; and FIG. 6 is an axial cross-section view of an inner ring of the bearing assembly of the present invention.

DETAILED DESCRIPTION OF THE INVENTION

Figure 1:
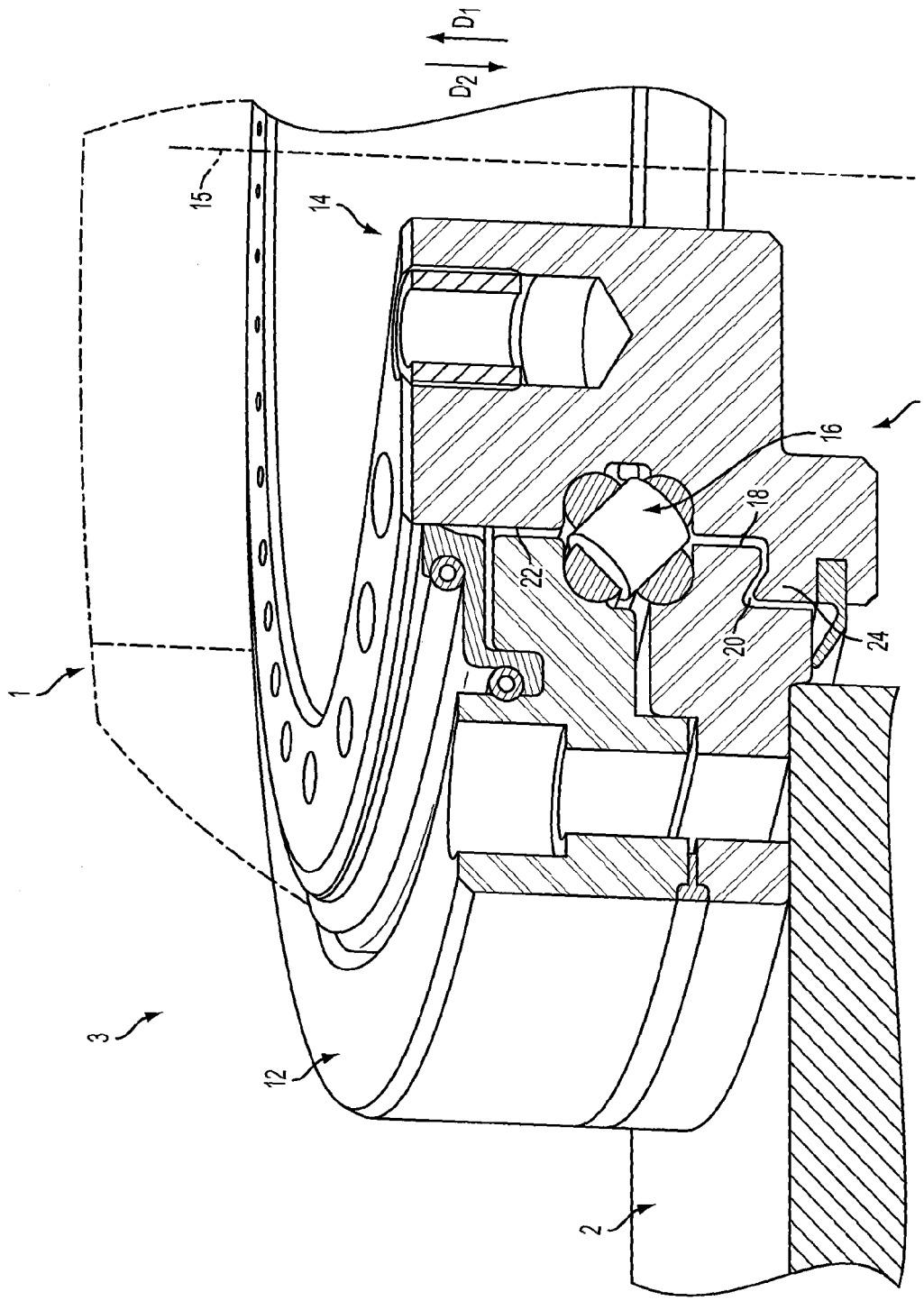
FIG. 1 is a broken-away, perspective view of a bearing assembly for a turret of a military vehicle in accordance with the present invention.

Certain terminology is used in the following description for convenience only and is not limiting. The words "lower", "upper", "upward", "down" and "downward" designate directions in the drawings to which reference is made. The words "inner", "inwardly" and "outer", "outwardly" refer to directions toward and away from, respectively, a designated centerline or a geometric center of an element being described, the particular meaning being readily apparent from the context of the description. Further, as used herein, the word "connected" is intended to include direct connections between two members without any other members interposed therebetween and indirect connections between members in which one or more other members are interposed therebetween. The terminology includes the words specifically mentioned above, derivatives thereof, and words of similar import.

Referring now to the drawings in detail, wherein like numbers are used to indicate like elements throughout, there is shown in FIGS. 1-6 a bearing assembly 10 that basically comprises an outer ring 12 and an inner ring 14, and preferably a plurality of rolling elements 16 disposed between and rotatably coupling the inner and outer rings 12, 14. In a presently preferred application, the outer ring 12 is configured to mount to the roof 2 of a military vehicle 3 and the inner ring 14 is configured to support a weapons turret 1 (shown in phantom in FIG. 1), such that the bearing assembly 10 rotatably connects the turret 1 to the vehicle 3, but the bearing assembly 10 may be used in any other appropriate application, as discussed below. The outer ring 12 has an inner circumferential surface 18 and a generally annular recess 20 extending radially outwardly from the inner surface 18. The inner ring 14 is disposed at least partially within the outer ring 12 so as to be rotatable about a central axis 15, which is preferably substantially vertical, and has an outer circumferential surface 22 spaced radially inwardly from the outer ring inner surface 18.

Further, the inner ring 14 has a least one shoulder 24 extending radially outwardly from the outer surface 22 so as to be disposed at least partially within the outer ring recess 20. Preferably, the shoulder 24 is integrally formed with a remainder of the inner ring 14, but may alternatively be provided by a separate component connected with the inner ring 14 (alternative structure not shown). Furthermore, the shoulder 24 is engageable with the outer ring 12 when the inner ring 14 is subjected to a significant axial force $F_A$ in a first, upward direction $D_1$ (i.e., an amount of force sufficient to bias the shoulder 24 upwardly against the outer ring 12), so as to substantially prevent axial displacement of the inner ring 14 relative to the outer ring 12. Thus, during the occurrence of a catastrophic event such as the detonation of an improvised explosive device ("IED"), a mine, etc. beneath the vehicle 3, the engagement of the shoulder 24 with the outer ring 12 substantially prevents, or at least substantially limits, relative axial movement between the rings 12, 14. Thus, damage to the bearing components is prevented such that the rolling elements 16 are capable of freely rolling after the diminishment of the explosive force $F_A$, thereby permitting the turret 1 to rotate as may be required to engage an attacking enemy.

More specifically, the outer ring 12 has a generally radial catch surface 21 partially defining the annular recess 22 and the inner ring shoulder 24 has a generally radial retention surface 25 facing the outer ring catch surface 21, as best shown in FIG. 3A, with both surfaces 21, 25 preferably extending entirely about the axis 15. The outer ring catch surface 21 faces generally in second or downward vertical direction $D_2$ and the inner ring retention surface 25 faces generally in the upward vertical direction $D_1$. As such, engagement of the inner ring shoulder 24 with the outer ring 12 prevents axial displacement of the inner ring 14 in the first, upward vertical direction $D_1$, but otherwise the shoulder 24 does not affect or interfere with motion (i.e., rotation) of the ring 14 and turret 1. Further, the catch and retention surfaces 21, 25, respectively are generally axially spaced apart to minimize friction during rotation of the inner ring 14 during normal use of the turret 1. More specifically, a gap $G_S$ (see FIG. 3A) is normally present between the facing catch and retention surfaces 21, 25 when no substantial upward axial force $F_A$ (i.e., from an explosion) is exerted on the bearing assembly 10; in other words, when upward axial force $F_A$ on the inner ring 14 is less than the amount necessary to "lift" the inner ring 14 so as to displace the shoulder 24 into engagement with the outer ring 12.

Preferably, each one of the outer ring catch surface 21 and the inner ring retention surface 25 is generally frustoconical and extends radially between an uppermost position $P_{UO}$, $P_{UI}$, respectively, at a respective outer diameter $OD_O$, $OD_I$, and a lowermost position $P_{LO}$, $P_{LI}$, respectively, at a respective inner diameter $ID_O$, $ID_I$, as indicated in FIG. 3A. As such, each of the catch and retention surfaces 21, 25, respectively, are generally sloped downwardly and inwardly, so that the surfaces 21, 25 interlock during an explosion/kinetic event and then after the event, the disengagement of the surfaces 21, 25 tends to center the inner ring 14 about/on the central axis 15 as gravity pulls the inner ring 14 in the downward direction $D_2$.

Figure 2:
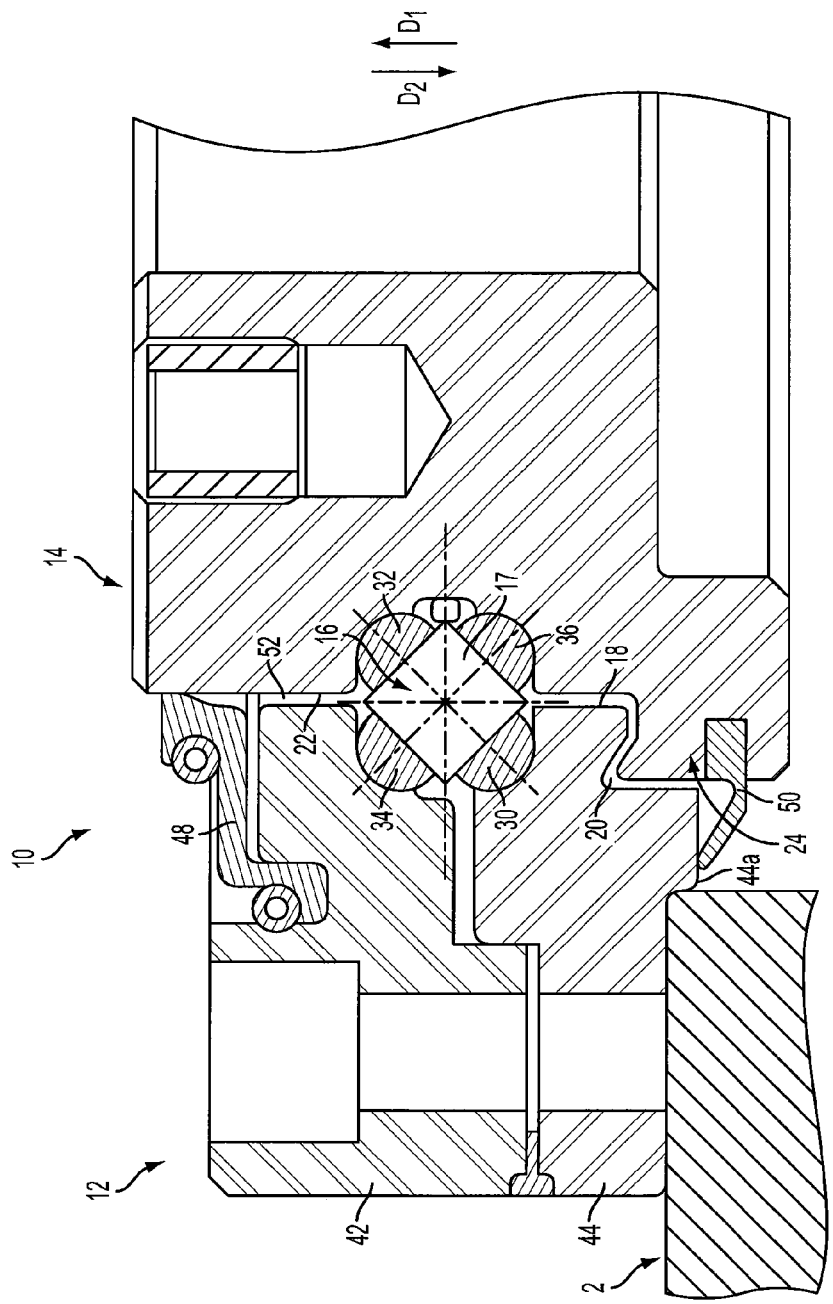
FIG. 2 is a broken-away, axial cross-sectional view of a bearing assembly of FIG. 1.
Figure 4:
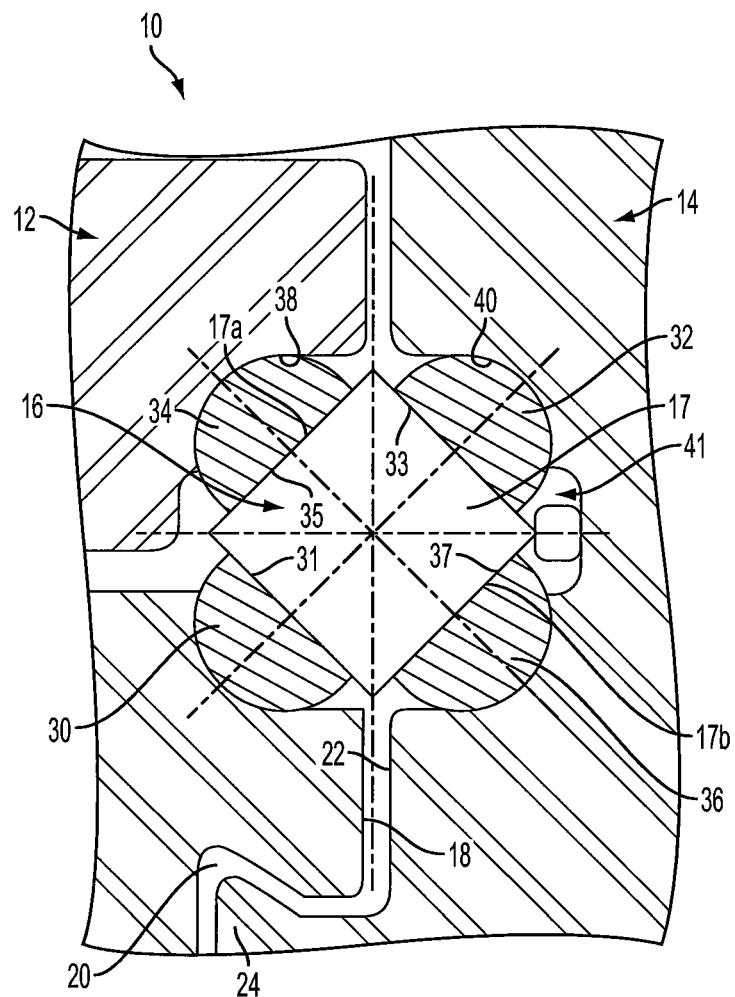
FIG. 4 is an enlarged view of a central portion of the bearing assembly of FIG. 2, showing a preferred rolling element structure with wire races.

Referring now to FIGS. 2 and 4, the bearing assembly 10 preferably further comprises at least one outer wire race 30 coupled with the outer ring 12 and having a running surface 31 and at least one inner wire race 32 coupled with the inner ring 14 and having a running surface 33 facing generally toward the outer running surface 31. The plurality of rolling elements 16, which are preferably cylindrical rollers 17, are disposed between the outer and inner races 30, 32 so as to roll upon the outer race running surface 31 and simultaneously upon the inner race running surface 33. Preferably, the outer ring 12 has a cavity 38 extending radially outwardly from the outer ring inner surface 18 and the inner ring 14 has a cavity 40 extending generally radially inwardly from the inner ring outer surface 22, the two cavities 38, 40 being generally radially aligned and defining a generally annular rolling element chamber 41 (see FIG. 4). With the above-noted structure, the outer wire race 30 is disposed within the outer ring cavity 38 and the inner wire race 32 is disposed within the inner ring cavity 40, with the rolling elements 16 being movably disposed in the defined chamber 41.

Most preferably, the bearing assembly 10 also preferably includes a second outer wire race 34 disposed in the outer ring cavity 38 and having a running surface 35 and a second inner wire race 36 disposed within the inner ring cavity 40 and having a running surface 37. The second outer race 34 is spaced axially from the first outer wire race 30 and the second inner race 34 is spaced axially from the first inner race 32, with the two second running surfaces 35, 37 being generally facing. With the four wire races 30, 32, 34, 36, the preferred cylindrical rollers 17 are preferably arranged in an alternating manner such that about half the rollers 17 roll upon the first running surfaces 31, 33, with sliding movement of the axial ends 17a, 17b of each roller 17 being guided by the second running surfaces 35, 37, and the remaining half of the rollers 17 roll upon the second running surfaces 35, 37, with axial ends 17a, 17b sliding on the first running surfaces 31, 33.

Thus, the bearing assembly 10 of the present invention is preferably in the nature of a "Franke" four-point-contact bearing, but may alternatively be formed in any other appropriate manner. For example, the rollers 17 may aligned in a single direction such that all the rolling elements 16 roll upon only one of the pairs of running surfaces 31, 33 or 35, 37, with axial ends sliding along the other pair of running surfaces 35, 37 or 31, 33, respectively. Further, the rolling elements 16 may alternatively be any other type of rolling element, such as tapered rollers, needles, balls, spherical rollers, etc. or the bearing assembly 10 may be formed as a journal bearing without any rolling elements.

Referring to FIGS. 5 and 6, the outer ring 12 has upper and lower ends 12a, 12b and is preferably formed of upper and lower generally annular bodies 42, 44 having interlocking shoulders 43 and 45 and coupled together by a plurality of fasteners (none shown). Such a two-piece assembly facilitates assembly of rolling elements 16 and wire races 30, 32, 34, 36 into the chamber 41. The outer ring annular recess 20 preferably extends axially upwardly from the outer ring lower end 12b, and as such that the recess 20 is generally formed as a counter bore in the lower annular body 44. As best shown in FIG. 6, the inner ring 14 is preferably formed of a single generally annular body 46 with the inner ring shoulder 24 extending axially between the inner ring lower end 14b and the retention surface 25. As such, the shoulder 24 is generally formed as an annular head received at least partially within the recess 20. Preferably, the shoulder 24 is formed as a single radial projection extending circumferentially about the entire inner ring 14 (i.e., circumferentially about the axis 15). However, the inner ring 14 may alternatively include two or more separate, circumferentially-spaced shoulders 24 formed as projections, tabs or lugs of any appropriate shape, such as for example, arcuate, rectangular, etc. Further for example, the shoulder 24 may alternatively be provided by one or more separate members or bodies (none shown) connected with the remainder of the inner ring body 46 by any appropriate means (e.g., fasteners, weldment, etc.)

Furthermore, the bearing assembly 10 preferably includes an upper seal 48 mounted in the outer ring upper body 42 and sealing against the inner ring outer surface 22 and a lower seal 50 mounted to the inner ring shoulder 24 and sealing against the lower surface 44a of the outer ring lower body 44 (see also FIG. 2). As such, the two seals 48, 50 seal a radial gap 52 between the outer ring inner surface 18 and the inner ring outer surface 22 to thereby prevent damage to the bearing rolling elements 16 and wire races 30, 32, 34, 36 from contaminants such as dust, rocks, water, etc or to otherwise inhibit rotation of the inner ring 14 relative to the outer ring 12.

Although described and depicted herein in a preferred application to rotatably mount a weapon/weapon system turret 1 to a military vehicle 3, the bearing assembly 10 of the present invention may be utilized in any other application in which an explosive or kinetic force may potentially be experienced by the bearing assembly and be of sufficient magnitude to potentially cause catastrophic bearing and race separation. For example, the bearing assembly 10 may be used to support a horizontal or vertical shaft of a boiler or similar high-pressure device. Further, the bearing assembly 10 may be utilized in any application where a sudden kinetic shock or axial load may be experienced in a non-explosive situation, such as for example, due to weapons recoil, on offshore cranes, derricks or oil mooring stations, in a rudder propeller, during operations of various components in rough seas, etc. Furthermore, the bearing assembly 10 may be constructed without any wire races and instead have conventional raceway surfaces on the rings 12, 14, and/or may have any other types of rolling elements besides cylindrical rollers, such as balls, tapered rollers, or even be formed without rolling elements, such as a journal bearing.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as generally defined in the appended claims.

We claim:

1. A bearing assembly comprising:
    an outer ring having an inner circumferential surface and a generally annular recess extending radially outwardly from the inner surface; and
    an inner ring disposed at least partially within the outer ring so as to be rotatable about a substantially vertical central axis, the inner ring having an outer circumferential surface spaced radially inwardly from the outer ring inner surface and at least one integral shoulder extending radially outwardly from the outer surface so as to be disposed at least partially within the outer ring recess, the shoulder being engageable with the outer ring when the inner ring is subjected to an axial force so as to substantially prevent axial displacement of the inner ring relative to the outer ring;
    wherein the outer ring has a generally frustoconical, generally radial catch surface facing generally in a first, downward vertical direction and partially defining the annular recess, the inner ring shoulder has a generally frustoconical, generally radial retention surface facing in a second, upward vertical direction toward the outer ring catch surface, each one of the outer ring catch surface and the inner ring retention surface extending between an uppermost position at an outer diameter and a lowermost position at an inner diameter, the catch and retention surfaces being engageable when the inner ring is subjected to an amount of axial force sufficient to displace the inner ring into contact with the outer ring so as to substantially prevent axial displacement of the inner ring in the second, upward vertical direction and being generally axially spaced apart to minimize friction during rotation of the inner ring when axial force on the inner ring is lesser than the amount of force.

2. The bearing assembly as recited in claim 1 further comprising a plurality of rolling elements disposed between and rotatably coupling the inner and outer rings.

3. The bearing assembly as recited in claim 1 wherein each one of the outer and inner rings has upper and lower axial ends, the outer ring recess extends axially upwardly from the outer ring lower end such that the recess is generally formed as a counter bore, and the inner ring shoulder extends axially between the inner ring lower end and the retention surface such that the shoulder is generally formed as an annular head received within the recess.

4. The bearing assembly as recited in claim 1 wherein the outer ring is configured to mount to a roof of a vehicle and the inner ring is configured to support a weapons turret such that the bearing assembly rotatably connects the turret to the vehicle.

5. The bearing assembly as recited in claim 1 further comprising at least one outer wire race coupled with the outer ring and having a running surface, at least one inner wire race coupled with the inner ring and having a running surface facing generally toward the outer running surface, and a plurality of rolling elements disposed between the outer and inner races so as to roll upon the outer race running surface and simultaneously upon the inner race running surface, the rolling elements rotatably coupling the inner and outer rings.

6. The bearing assembly as recited in claim 5 wherein:
    the outer ring has a cavity extending radially outwardly from the outer ring inner surface and the outer wire race is disposed within the outer ring cavity; and
    the inner ring has a cavity extending generally radially inwardly from the inner ring outer surface and the at least one inner wire race is disposed within the inner ring cavity, the outer ring cavity and the inner ring cavity being generally aligned and defining a generally annular rolling element chamber.

7. A bearing assembly comprising:

an outer ring having an inner circumferential surface, a generally annular recess extending radially outwardly from the inner surface, and a generally frustoconical, generally radial catch surface facing generally in a first, downward vertical direction and partially defining the annular recess; and an inner ring disposed at least partially within the outer ring so as to be rotatable about a substantially vertical central axis, the inner ring having an outer circumferential surface spaced radially inwardly from the outer ring inner surface and at least one shoulder extending radially outwardly from the outer surface so as to be disposed at least partially within the outer ring recess, the shoulder having a generally frustoconical, generally radial retention surface facing generally in a second, upward vertical direction toward the outer ring catch surface, each one of the outer ring catch surface and the inner ring retention surface extending between an uppermost position at an outer diameter and a lowermost position at an inner diameter, the catch and retention surfaces being engageable when the inner ring is subjected to at least an amount of axial force sufficient to bias the shoulder against the outer ring so as to substantially prevent axial displacement of the inner ring relative to the outer ring in the second, upward vertical direction.

8. The bearing assembly as recited in claim 7 wherein the catch and retention surfaces are generally axially spaced apart to minimize friction during rotation of the inner ring when axial force on the inner ring is lesser than the amount of force.

9. The bearing assembly as recited in claim 7 wherein each one of the outer and inner rings has upper and lower axial ends, the outer ring recess extends axially upwardly from the outer ring lower end such that the recess is generally formed as a counter bore, and the inner ring shoulder extends axially between the inner ring lower end and the retention surface such that the shoulder is generally formed as an annular head received within the recess.

10. The bearing assembly as recited in claim 7 wherein the shoulder is integrally formed with a remainder of the inner ring.

11. The bearing assembly as recited in claim 7 further comprising a plurality of rolling elements disposed between and rotatably coupling the inner and outer rings.

12. The bearing assembly as recited in claim 7 wherein the outer ring is configured to mount to a roof of a vehicle and the inner ring is configured to support a weapons turret such that the bearing assembly rotatably connects the turret to the vehicle.

13. The bearing assembly as recited in claim 7 further comprising at least one outer wire race coupled with the outer ring and having a running surface, at least one inner wire race coupled with the inner ring and having a running surface facing generally toward the outer running surface, and a plurality of rolling elements disposed between the outer and inner races so as to roll upon the outer race running surface and simultaneously upon the inner race running surface, the rolling elements rotatably coupling the inner and outer rings.

14. A bearing assembly for rotatably coupling a weapon turret to a vehicle, the vehicle having a roof, the bearing assembly comprising:

an outer ring fixedly connected with the roof and having an inner circumferential surface and a generally annular recess extending radially outwardly from the inner surface;

an inner ring connectable with the turret and disposed at least partially within the outer ring so as to be rotatable about a substantially vertical central axis, the inner ring having an outer circumferential surface spaced radially inwardly from the outer ring inner surface and at least one integral shoulder extending radially outwardly from the outer surface so as to be disposed at least partially within the outer ring recess, the shoulder being engageable with the outer ring when the inner ring is subjected to an axial force so as to substantially prevent axial displacement of the inner ring relative to the outer ring; and a plurality of rolling elements disposed between the inner and outer rings;

wherein the outer ring has a generally frustoconical, generally radial catch surface facing generally in a first, downward vertical direction and partially defining the annular recess, the inner ring shoulder has a generally frustoconical, generally radial retention surface facing in a second, upward vertical direction toward the outer ring catch surface, each one of the outer ring catch surface and the inner ring retention surface extending between an uppermost position at an outer diameter and a lowermost position at an inner diameter, the catch and retention surfaces being engageable when the inner ring is subjected to an amount of axial force sufficient to displace the inner ring into contact with the outer ring so as to substantially prevent axial displacement of the inner ring in the second, upward vertical direction and being generally axially spaced apart to minimize friction during rotation of the inner ring when axial force on the inner ring is lesser than the amount of force.

* * * * *